US012450257B2

(12) United States Patent
Bauer et al.

(10) Patent No.: US 12,450,257 B2
(45) Date of Patent: *Oct. 21, 2025

(54) SYSTEM AND METHOD FOR SYNCHRONIZING DISTRIBUTED DATABASES

(71) Applicant: Village Practice Management Company, LLC, Chicago, IL (US)

(72) Inventors: Nicholaus J. Bauer, Joliet, IL (US); Michael J. Roberts, Elmhurst, IL (US); Dennis Payonk, Chicago, IL (US)

(73) Assignee: VILLAGE PRACTICE MANAGEMENT COMPANY, LLC, Chicago, IL (US)

( * ) Notice: Subject to any disclaimer, the term of this patent is extended or adjusted under 35 U.S.C. 154(b) by 667 days.

This patent is subject to a terminal disclaimer.

(21) Appl. No.: 17/228,316

(22) Filed: Apr. 12, 2021

(65) Prior Publication Data

US 2021/0232600 A1 Jul. 29, 2021

Related U.S. Application Data

(63) Continuation of application No. 16/230,001, filed on Dec. 21, 2018, now Pat. No. 10,977,275.

(51) Int. Cl.
*G06F 16/27* (2019.01)
*G06F 16/23* (2019.01)

(52) U.S. Cl.
CPC ........ *G06F 16/273* (2019.01); *G06F 16/2379* (2019.01)

(58) Field of Classification Search
CPC ... G06F 16/273; G06F 16/2379; G06F 16/275
See application file for complete search history.

(56) References Cited

U.S. PATENT DOCUMENTS

| 7,430,562 B1* | 9/2008 | Bedell | G06F 16/24542 |
| | | | 707/999.102 |
| 8,849,767 B1 | 9/2014 | Zheng | |
| 2006/0004878 A1* | 1/2006 | Lawrence | G06F 16/24578 |
| 2008/0294696 A1 | 11/2008 | Frandzel | |
| 2011/0302187 A1 | 12/2011 | Otsuka | |

(Continued)

*Primary Examiner* — Robert W Beausoliel, Jr.
*Assistant Examiner* — Mohammad S Bhuyan
(74) *Attorney, Agent, or Firm* — Kutak Rock LLP

(57) ABSTRACT

Methods and systems for synchronizing distributed databases are provided. In one aspect, a method includes transmitting a request to determine a schema of a first database and updating a metadata store with the schema. The method includes generating at least one database query. The method includes, responsive to the database query, selectively determining a data block size for a second database; segmenting a data source stored in the second database into sink data blocks; processing the data source into sink hashes; and transmitting, to an agent, at least one selected sink hash, wherein the agent transmits instructions to segment a table associated with the first database into source data blocks; process the table into source hashes; and generate, in response to a determination that the at least one selected sink hash differs from a corresponding source hash, query results. The method includes updating the data source with the query results.

20 Claims, 9 Drawing Sheets

(56) References Cited

U.S. PATENT DOCUMENTS

| | | | |
|---|---|---|---|
| 2012/0254105 A1* | 10/2012 | Martin | G06F 16/275 707/615 |
| 2014/0289193 A1* | 9/2014 | Zhou | H04L 45/54 707/612 |
| 2015/0127679 A1* | 5/2015 | Wing | G06F 11/0793 707/770 |
| 2015/0207844 A1* | 7/2015 | Tataroiu | H04L 67/1095 709/219 |
| 2015/0281363 A1* | 10/2015 | Lange | G06F 16/9027 709/203 |
| 2016/0179853 A1* | 6/2016 | Bertin | G06F 16/113 707/662 |
| 2016/0210195 A1* | 7/2016 | Sinha | G06F 11/2097 |
| 2017/0193004 A1* | 7/2017 | Karuppusamy | G06F 11/1004 |
| 2018/0081548 A1* | 3/2018 | Barzik | G06F 3/064 |
| 2018/0225352 A1* | 8/2018 | Purushothaman | G06F 16/278 |
| 2018/0246886 A1* | 8/2018 | Dragomirescu | G06F 16/2379 |
| 2018/0260458 A1* | 9/2018 | Huang | G06F 16/258 |
| 2020/0409977 A1* | 12/2020 | Yang | G06F 16/275 |

\* cited by examiner

SYSTEM AND METHOD FOR SYNCHRONIZING DISTRIBUTED DATABASES

CROSS-REFERENCE TO RELATED APPLICATIONS

The present disclosure is related and claims priority as a continuation application to U.S. application Ser. No. 16/230,001, now U.S. Pat. No. 10,977,275, entitled SYSTEM AND METHOD FOR SYNCHRONIZING DISTRIBUTED DATABASES, filed on Dec. 21, 2018, to Nicholaus J. Bauer et al., the contents of which are hereby incorporated by reference in their entirety, for all purposes.

TECHNICAL FIELD

The present disclosure generally relates to data storage, and more specifically relates to systems and methods for synchronizing distributed databases.

BACKGROUND

Within some organizations, database synchronization is often performed between databases with homogeneous technology over a network or via a managed point-to-point link that is controlled by the organization. When data is shared between two different organizations, often times, however, the databases are not connected via a common private network, but are merely connected via the Internet, which may not be secure. Moreover, in some instances, the databases, for example, a remote source database and a synchronization database (e.g., destination database), may be heterogeneous database technologies, which may include different database schema.

The description provided in the background section should not be assumed to be prior art merely because it is mentioned in or associated with the background section. The background section may include information that describes one or more aspects of the subject technology.

SUMMARY

The disclosed methods and systems provide for synchronizing distributed databases. In one aspect of the present disclosure, a computer-implemented method is described that includes transmitting a schema request to determine a database schema of a first database and updating a metadata store with the database schema of the first database. The metadata store includes the database schema of the first database and configuration parameters. The computer-implemented method also includes generating at least one database query. The computer-implemented method also includes selectively determining a data block size for a second database based at least on the configuration parameters and the database schema. The computer-implemented method also includes segmenting a sink data source stored in the second database into sink data blocks based on the data block size. The computer-implemented method also includes processing the sink data source into sink hashes representing the sink data blocks. The computer-implemented method also includes transmitting, to an agent, at least one selected sink hash of the sink hashes, wherein the agent transmits, in response to receiving the at least one selected sink hash, instructions to: segment a table associated with the first database into source data blocks based on the data block size; process the table into source hashes representing the source data blocks; and generate, in response to a determination that the at least one selected sink hash differs from a corresponding source hash of the source hashes, query results. The computer-implemented method also includes updating the sink data source stored in the second database with the query results.

According to certain aspects of the present disclosure, a system is provided that includes a memory comprising instructions and one or more processors configured to execute the instructions to transmit, to an agent by a coordinator server, a schema request to determine a source database schema of a source database hosted on a source server. The one or more processors also execute instructions to update, at a configuration server by a coordinator server, a metadata store with the source database schema of the source database, the metadata store comprising the source database schema of the source database and configuration parameters. The one or more processors also execute instructions to generate, by the coordinator server, at least one database query. The one or more processors also execute instructions to compute, by a sink hash application in response to the at least one database query, a sink hash tree of a sink data source, the sink hash tree comprising sink hashes. The one or more processors also execute instructions to transmit, to the agent, at least one selected sink hash of the sink hashes, wherein the agent transmits, in response to receiving the at least one selected sink hash, instructions to: compute, by a source hash application in response to the agent receiving the at least one selected sink hash, a source hash tree of a source table associated with the source database, the source hash tree including source hashes; and generate, in response to a determination that the at least one selected sink hash differs from a corresponding source hash of the source hashes, query results. The one or more processors also execute instructions to update the sink data source stored in the sink database with the query results.

In yet another aspect, a non-transitory machine-readable storage medium comprising machine-readable instructions for causing one or more processors to execute a method. The method includes transmitting a schema request to determine a source database schema of a source database hosted on a source server. The method also includes updating a metadata store with the source database schema of the source database, the metadata store comprising the source database schema of the source database and configuration parameters. The method also includes generating at least one database query. The method also includes selectively determining a data block size for a sink database based at least on the configuration parameters, the source database schema, and monitored synchronization performance over time between the source database and the sink database. The method also includes segmenting a sink data source stored in the sink database into sink data blocks based on the data block size. The method also includes processing the sink data source into sink hashes representing the sink data blocks. The method also includes transmitting, to an agent, at least one selected sink hash of the sink hashes, wherein the agent, in response to receiving the at least one selected sink hash, transmits instructions to: segment a source table stored in the source database into source data blocks based on the data block size; process the source table into source hashes representing the source data blocks; and generate, in response to a determination that the at least one selected sink hash differs from a corresponding source hash of the source hashes, query results. The method also includes updating the sink data source stored in the sink database with the query results.

In yet another aspect, a system is described that includes a means for transmitting a schema request to determine a database schema of a first database. The means for transmitting the schema request also includes updating a metadata store with the database schema of the first database. The metadata store includes the database schema of the first database and configuration parameters. The means for transmitting the schema request also includes generating at least one database query. The means for transmitting the schema request also includes selectively determining, responsive to the at least one database query, a data block size for a second database based at least on the configuration parameters and the database schema. The means for transmitting the schema request also includes segmenting a sink data source stored in the second database into sink data blocks based on the data block size. The means for transmitting the schema request also includes processing the sink data source into sink hashes representing the sink data blocks. The means for transmitting the schema request also includes transmitting, to the agent, at least one selected sink hash of the sink hashes, wherein the agent transmits, in response to receiving the at least one selected sink hash, instructions to: segment a table associated with the first database into source data blocks based on the data block size; process the table into source hashes representing the source data blocks; and generate, in response to a determination that the at least one selected sink hash differs from a corresponding source hash of the source hashes, query results. The means for transmitting the schema request also includes updating the sink data source stored in the second database with the query results.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and, together with the description, serve to explain the principles of the disclosed embodiments. In the drawings.

Figure 1:
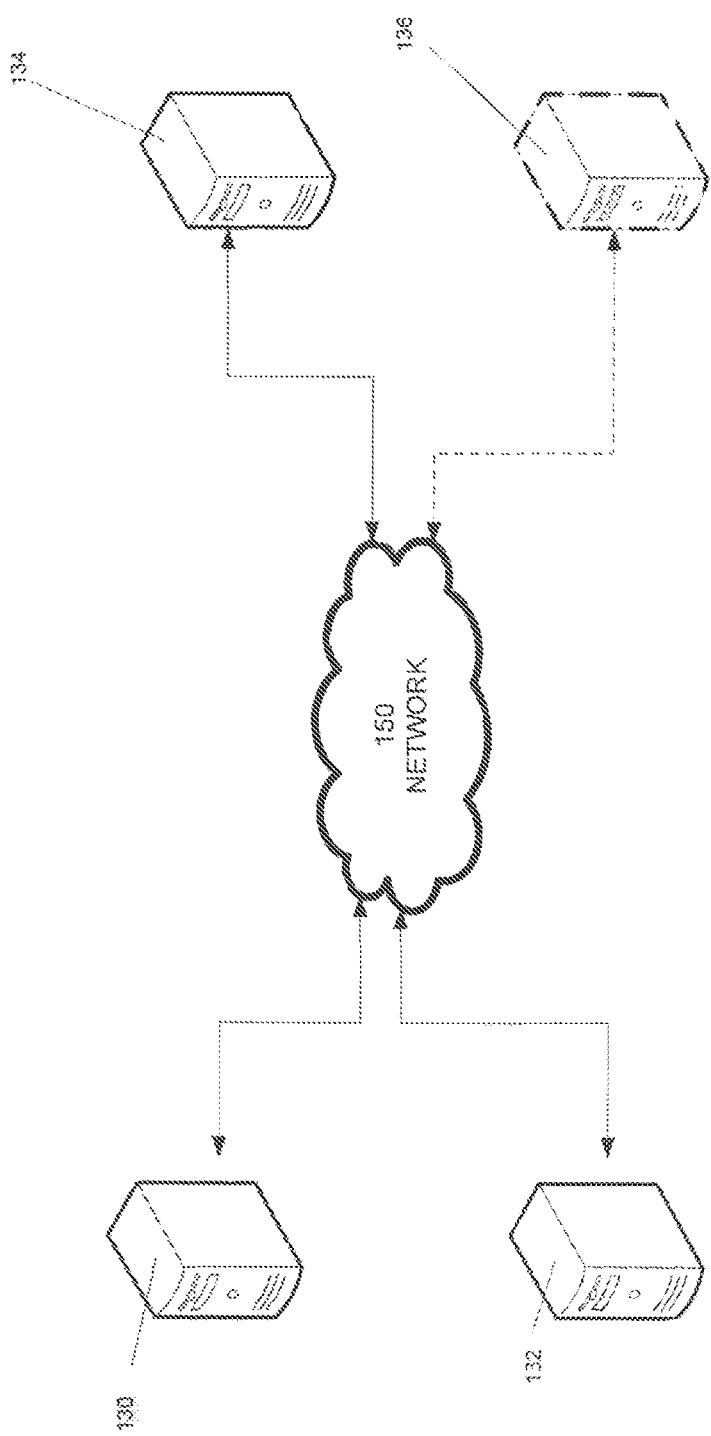
FIG. 1 illustrates an example architecture for synchronizing distributed databases.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art will realize, the described implementations may be modified in various different ways, all without departing from the scope of the present disclosure. Accordingly, the drawings and description are to be regarded as illustrative in nature and not restrictive.

General Overview

The disclosed system provides for securely synchronizing heterogeneous distributed databases via the Internet. For example, a sink database of an organization may include a sink database schema that is different from a source database schema of a source database of another organization. In such instances, the disclosed system determines the source database schema in order to associate a sink data source of the sink database with parameters of the source database schema. The disclosed system is then able to determine a differential result set between the source database and the sink database and securely transmit the differential result set via the Internet in order to update or synchronize the sink database.

An obvious approach to synchronize the heterogeneous distributed databases may be to send all the data from a source database to a sink database such that a query is run to check each column of the source database to see if the data matches. Such an approach, however, becomes inefficient as the database size grows beyond gigabytes of data. For example, a source database having hundreds of gigabytes of data may take many hours to transmit to a sink database and may exceed a target window for synchronization (e.g., 8 hours). Not only is it inefficient to transmit such large amounts of data over the Internet, in a healthcare context, for example, such an approach may increase the likelihood of undesired disclosure of protected health information (PHI).

The disclosed system addresses a technical problem tied to computer technology and arising in the realm of computer networks, namely the technical problem of synchronizing heterogeneous databases, in which a synchronization process is limited to read-only access credentials to a source database. The disclosed system addresses this technical problem by computing a differential result set of the source database and the sink database and securely transmitting the differential result set via the Internet (e.g., synchronizing heterogeneous databases when the synchronization process does not have access to transaction logs of the source database). The disclosed system also addresses the technical problem of transmitting large amounts of data to perform synchronization of heterogeneous databases. The disclosed system solves these technical problems by securing and minimizing data size of the differential result set transmitted via the Internet while also eliminating the need for prior knowledge of database schema of the source database. For example, the disclosed system selectively determines, in response to a database query, a data block size for a sink database and segments a sink data source of the sink database into sink data blocks based on the data block size. Sink hashes representing the sink data blocks are generated and transmitted to an agent for determining the differential result set, against the source database, which is securely transmitted to the sink database for updating or synchronizing the sink data source.

The disclosed system also provides an improvement to computer functionality by allowing computer performance of a function not previously performed by a computer. Specifically, the disclosed system provides for monitoring synchronization performance between a sink database and a selected source database and, based on synchronization performance over time, selectively determining the data block size for future database queries between the sink database and the selected source database. In certain aspects, the disclosed system allows for computing the source hashes on a server other than the source server, which reduces the CPU load of the source database, e.g., saves data storage space and reduces network usage, and increases efficiency by foregoing the need to recalculate a synchronization operation for each database query by performing the synchronization operation from a snapshot cached on the server other than the source server.

The principles of the present disclosure contemplate various types of organizations. For example, corporations and governmental entities (e.g., administrative or military) are all considered within the scope of the present disclosure. The exemplary corporations and governmental entities may be associated with the healthcare industry and the like.

Although certain examples provided herein may describe a user's information being stored in memory, in certain aspects, each user must grant explicit permission for such user information to be stored. The explicit permission may be granted using privacy controls integrated into the disclosed system. If requested user information includes demographic information, then the demographic information is aggregated on a group basis and not by an individual user. Each user is provided notice that such user information will be stored with such explicit consent, and each user may, at any time, end having the user information stored, and may delete the stored user information. The stored user information may be encrypted to protect user security.

The user can at any time delete the user information from memory and/or opt out of having the user information stored in memory. Additionally, the user can, at any time, adjust appropriate privacy settings to selectively limit the types of user information stored in memory, or select the memory in which the user information is stored (e.g., locally on the user's device as opposed to remotely on a server). In many examples, the user information does not include and/or share the specific identification of the user (e.g., the user's name) unless otherwise specifically provided or directed by the user.

Example System Architecture

FIG. 1 illustrates an example architecture 100 for synchronizing distributed databases. The architecture 100 includes at least one configuration server 130, at least one coordinator server 132, and at least one source server 134 connected over a network 150. In certain aspects, the example architecture 100 includes an agent server 136 also connected to the network 150 and illustrated in phantom, which will be discussed in more detail below with reference to FIG. 3.

Figure 2:
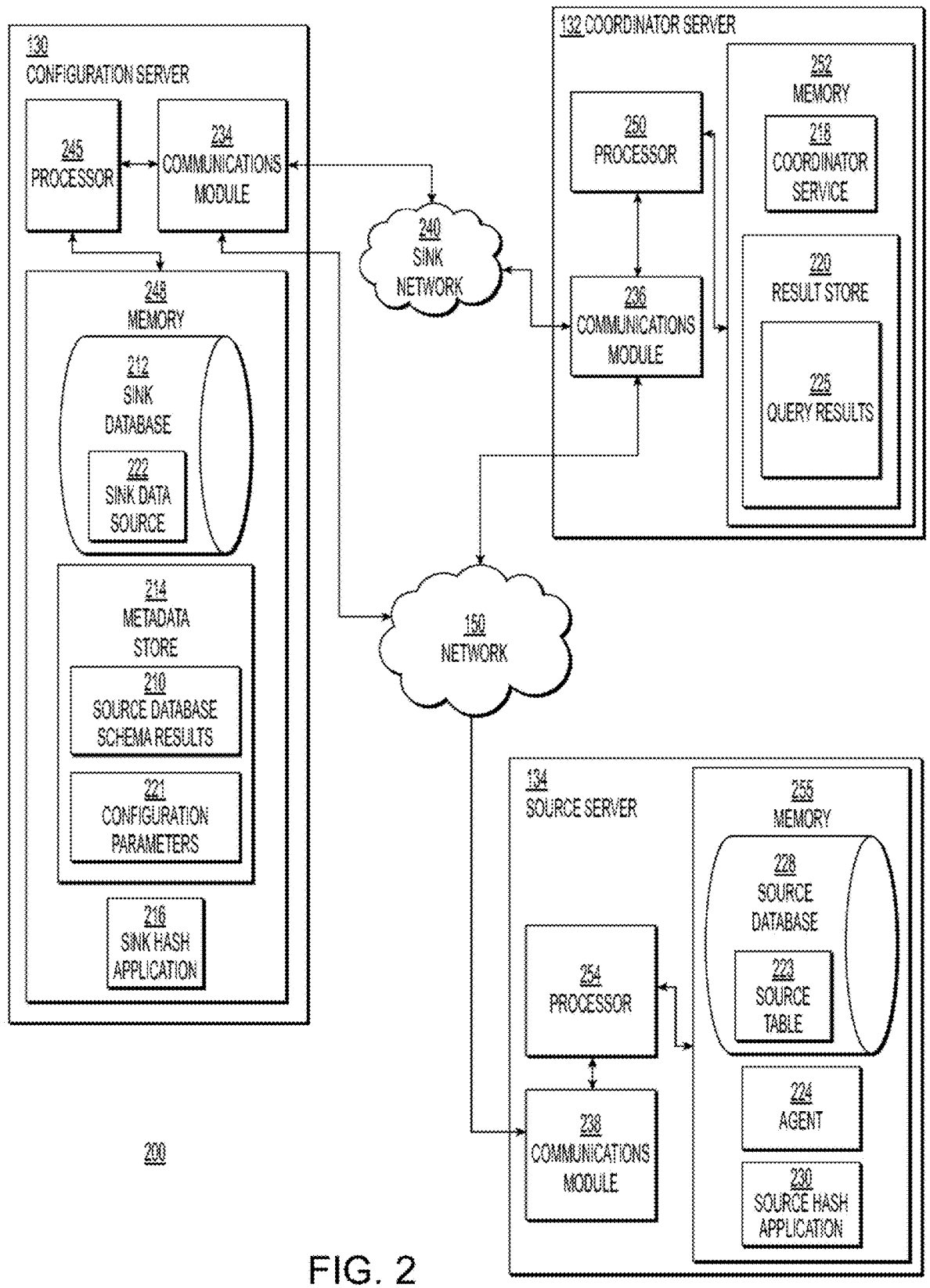
FIG. 2 is a block diagram illustrating example servers from the architecture of FIG. 1 according to certain aspects of the disclosure.
Figure 3:
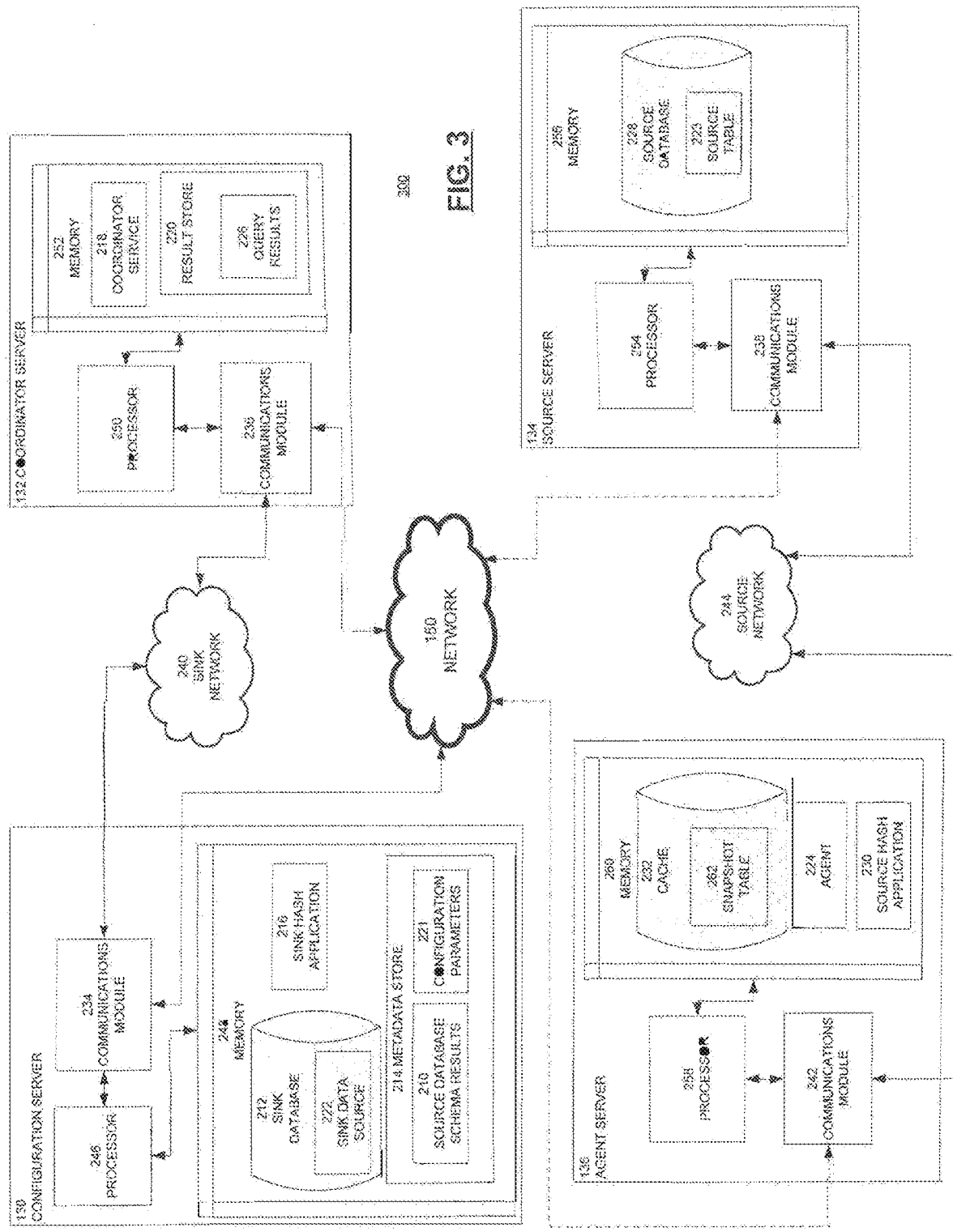
FIG. 3 is a block diagram illustrating example servers from the architecture of FIG. 1 according to another aspect of the disclosure.

The configuration server(s) 130 is configured to host a sink database 212, a metadata store 214, and a sink hash application 216 (see FIGS. 2 and 3). The sink database 212 and the metadata store 214 on the configuration server 130 are in communication with the coordinator server(s) 132. The configuration server 130 includes security credentials such as, but not limited to, login and password data for accessing the source server(s) 134. For purposes of load balancing, a plurality of configuration servers 130 may host the sink database 212, the metadata store 214, and the sink hash application 216. The configuration server 130 may be any device comprising an appropriate processor, memory, and communications capability for hosting the sink database 212, the metadata store 214, and the sink hash application 216.

The coordinator server 132 is configured to host a coordinator service 218 and a result store 220 (see FIGS. 2 and 3). The coordinator service 218 of the coordinator server 132 transmits at least one database query 505 (see FIG. 5) to an agent 224, which may be hosted on the source server 134 or, alternatively, may be hosted on the agent server 136. The coordinator server 132 receives query results 226 from the agent 224 and stores the query results 226 in the result store 220 for transmission to the configuration server 130. The coordinator server 132 is in communication with the sink database 212 and the metadata store 214. For purposes of load balancing, a plurality of coordinator servers 132 may host the coordinator service 218 and the result store 220. The coordinator server 132 may be any device comprising an appropriate processor, memory, and communications capability for hosting the coordinator service 218 and the result store 220.

Although the functionalities of the configuration server 130 and the coordinator server 132 are described above as being on separate servers, it is to be understood that the functionalities of the configuration server 130 and the coordinator server 132 can be combined into a single server, such as, for example, the coordinator server 132.

In certain aspects, the source server 134 is configured to host the agent 224, a source database 228, and a source hash application 230. The agent 224 is in communication with at least the configuration server 130, the coordinator server 132, the source database 228, and the source hash application 230. For purposes of load balancing, a plurality of source servers 134 may host the agent 224, the source database 228, and the source hash application 230. The source server 134 may be any device comprising an appropriate processor, memory, and communications capability for hosting the agent 224, the source database 228, and the source hash application 230.

In certain aspects, such as when the agent 224 is not hosted on the source server 134, the agent server 136 is configured to host the agent 224, the source hash application 230, and a cache 232. In such aspects, the agent 224 is in communication with at least the configuration server 130, the coordinator server 132, the source database 228, the source hash application 230, and the cache 232. For purposes of load balancing, a plurality of agent servers 136 may host the agent 224, the source hash application 230, and the cache 232. The agent server 136 may be any device comprising an appropriate processor, memory, and communications capability for hosting the agent 224, the source hash application 230, and the cache 232.

The network 150 can include, for example, any one or more of a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like. The network 150 may be wired or wireless, as mentioned hereinbelow.

Example Systems for Synchronizing Distributed Databases

FIG. 2 is a block diagram illustrating a system 200 comprising the configuration server 130, the coordinator server 132, and the source server 134 shown in the architecture 100 of FIG. 1 according to certain aspects of the disclosure. The configuration server 130, the coordinator server 132, and the source server 134 are connected over the network 150 via respective communications modules 234, 236, 238. The communications modules 234, 236, 238 are configured to interface with the network 150 to transmit and receive information, such as data, requests, responses, and commands to other devices on the network 150. The communications modules 234, 236, 238 can be, for example, modems or Ethernet cards, and/or other suitable communications hardware/software. Additionally, in certain aspects, the configuration server 130 is also connected to the coordinator server 132 over a sink network 240 via the communications module 234 and the communications module 236, respectively.

The sink network 240 can include, for example, any one or more of a personal area network (PAN), a local area network (LAN), a campus area network (CAN), and the like. Further, the sink network 240 can include, but is not limited to, any one or more of the following network topologies, including a bus network, a star network, a ring network, a mesh network, a star-bus network, tree or hierarchical network, and the like. The sink network 240 may be wired or wireless.

The configuration server 130 includes a processor 246, the communications module 234, and a memory 248 that includes the sink database 212, the metadata store 214, and the sink hash application 216. The processor 246 of the configuration server 130 is configured to execute instructions, such as instructions physically coded into the processor 246, instructions received from software in memory 248, instructions delivered from a remote memory, or a combination thereof. For example, the processor 246 of the configuration server 130 executes instructions, received from the coordinator service 218, to receive a database schema 402 (see FIG. 4) of the source database 228 for updating source database schema results 210 stored at the metadata store 214. Configuration parameters 221 are also stored on the metadata store 214. In certain aspects, the configuration parameters 221 include, but are not limited to, desired block size (e.g., preferred size of data returned from any single interaction or database query with the source database 228 of the source server 134), maximum block size, desired operation duration (e.g., preferred running time of any interaction or database query with the source database 228 of the source server 134), maximum operation duration, desired CPU utilization, number of shards, number of database interactions, rows per leaf (e.g., source data blocks 621, cf. FIG. 6), columns as leaves (e.g., source data blocks 621), and any other parameters well known in the industry. The processor 246 of the configuration server 130 transmits, in response to a credential request from the coordinator service 218, security credentials (e.g., login and password) to the source server 134 for access to the source database 228. In certain aspects, the security credentials only provide read-only access to the source database 228 and do not provide write access to the source database 228.

The coordinator server 132 includes a processor 250, the communications module 236, and a memory 252 that includes the coordinator service 218 and the result store 220. The processor 250 of the coordinator server 132 is configured to execute instructions, such as instructions physically coded into the processor 250, instructions received from software in memory 252, instructions delivered from a remote memory, or a combination thereof. For example, the processor 250 of the coordinator server 132 executes instructions from the coordinator service 218 to generate a source database schema request 404 (see FIG. 4) for requesting the database schema 402 of the source database 228 and to transmit the source database schema request 404 to the agent 224. Moreover, the coordinator server 132 receives, from the agent 224 in response to the source database schema request 404, the database schema 402 of the source database 228 for updating the source database schema results 210 in the metadata store 214. In certain aspects, the coordinator server 132 receives the database schema 402 of the source database 228, as query results 226, at the result store 220 for updating the source database schema results 210 in the metadata store 214. In certain aspects, for example, the query results 226 are formatted as JavaScript Object Notation (JSON), although other formats are also within the scope of the disclosure.

The processor 250 of the coordinator server 132 also executes instructions from the coordinator service 218 to generate at least one database query 505 (see FIG. 5) and to transmit the database queries 505 to the agent 224 to perform the database queries 505. The processor 250 of the coordinator server 132 also executes instructions from the coordinator service 218 to receive, from the agent 224, the query results 226, such as the differential result set, computed by the agent 224. The processor 250 of the coordinator server 132 is in communication with the sink database 212 for updating or merging the query results 226 with the sink data source 222. In some aspects, the coordinator server 132 also executes instructions from the coordinator service 218 to transmit the at least one selected sink hash 508 to the agent 224.

As mentioned above, although the functionalities of the configuration server 130 and the coordinator server 132 are described above as being on separate servers, it is to be understood that the functionalities of the configuration server 130 and the coordinator server 132 can be combined into a single server, such as, for example, the coordinator server 132.

The source server 134 includes a processor 254, the communications module 238, and a memory 256 that includes the source database 228, the agent 224, and the source hash application 230. The processor 254 of the source server 134 is configured to execute instructions, such as instructions physically coded into the processor 254, instructions received from software in memory 256, instructions delivered from a remote memory, or a combination thereof. For example, the processor 254 of the source server 134 is configured to, responsive to the security credentials received by the agent 224 from the configuration server 130, authenticate the security credentials. Upon authentication of the security credentials, the processor 254 grants the agent 224 read-only access to the source database 228. The processor 254 of the source server 134 also is configured to, responsive to source database schema request 404 received by the agent 224 from the coordinator server 132, compute, via the agent 224, the source database schema 402 and generate source database schema results 210 to transmit to the coordinator server 132.

The processor 254 of the source server 134 also is configured to, responsive to the agent 224 receiving at least one selected sink hash 508, compute, via the source hash application 230, the source hash tree 509 (e.g., source hashes) of the source table 223 associated with the source database 228. In certain aspects, the source hash tree 509 includes source hashes. The processor 254 of the source server 134 also is configured to, responsive to the agent 224 receiving at least one selected sink hash 508, segment, via the source hash application 230, the source table 223 associated with the source database 228 into the source data blocks 421 based on the data block size 615. The processor 254 of the source server 134 also is configured to, process, via the source hash application 230, the source table 223 into the source hash tree 509 representing the source data blocks 421. In certain aspects, the source hash application 230 generates specialized database queries to generate selected source hashes.

The processor 254 of the source server 134 is also configured to, responsive to the source hash application 230 determining that the at least one selected sink hash 508 differs from the corresponding source hash 511 of the source hash tree 509, generate, via the agent 224, the query results 226. The processor 250 of the coordinator server 132 is also configured to, responsive to instructions from the coordinator service 218, transmit the query results 226 to the configuration server 130, via the communication modules 236, 234 and the sink network 240, where the processor 246 of the configuration server 130, responsive to instructions from the sink hash application 216, updates the sink data source 222 residing in the sink database 212. In certain aspects, the processor 254 of the source server 134 is also configured to transmit, to the coordinator service 218 via the agent 224, the network 150, and the communication modules 238, 236, notifications indicative of updates or changes to the source table 223.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of steps of the method(s).

FIG. 3 is a block diagram illustrating a system 300 comprising the configuration server 130, the coordinator server 132, the source server 134, and the agent server 136 shown in the architecture 100 of FIG. 1 according to certain aspects of the disclosure. The system 300 is differentiated from the system 200 shown in FIG. 2 in that the agent 224 and the source hash application 230 are offloaded from the source server 134 and hosted on the agent server 136 instead. The configuration server 130, the coordinator server 132, the source server 134, and the agent server 136 are connected over the network 150 via respective communications modules 234, 236, 238, 242. The connections of the communications modules 238, 242 are shown in phantom to illustrate that, in certain aspects, the communications module 242 is connected to the network 150 while the communications module 238 is not connected to the network 150. In other aspects, the communications module 238 is connected to the network 150 while the communications module 242 is not connected to the network 150. In some other aspects, both the communications modules 238, 242 are connected to the network 150. The communications modules 234, 236, 238, 242 are configured to interface with the network 150 to transmit and receive information, such as data, requests, responses, and commands to other devices on the network 150. The communications modules 234, 236, 238, 242 can be, for example, modems or Ethernet cards. In certain aspects, the configuration server 130 is also connected to the coordinator server 132 over the sink network 240 via the communications module 234 and the communications module 236, respectively. In certain aspects, the source server 134 is also connected to the agent server 136 over a source network 244 via the communications module 238 and the communications module 242, respectively. In certain aspects, as an effort to increase security and prevent undesired disclosure of sensitive information, e.g., PHI in healthcare contexts, the communication modules 238, 242, while connected to the network 150, do not include any open listening ports such that the source network 244 does not include any open ports to the network 150 (e.g., the Internet). In such aspects, the communications modules 238, 242, transmit outgoing connection requests via the network 150 to establish communication with either the configuration server 130 or the coordinator server 132.

The source network 244 can include, for example, any one or more of a personal area network (PAN), a local area network (LAN), a campus area network (CAN), and the like. Further, the source network 244 can include, but is not limited to, any one or more of the following network topologies, including a bus network, a star network, a ring network, a mesh network, a star-bus network, tree or hierarchical network, and the like. The source network 244 may be wired or wireless.

The agent server 136 includes a processor 258, the communications module 242, and a memory 260 that includes the agent 224, the source hash application 230, and a cache 232. The processor 258 of the agent server 136 is configured to execute instructions, such as instructions physically coded into the processor 258, instructions received from software in memory 260, instructions delivered from a remote memory, or a combination thereof. For example, the processor 258 of the agent server 136 is configured to, responsive to the security credentials received by the agent 224 from the configuration server 130, transmit the security credentials to the source server 134 to authenticate the security credentials. Upon authentication of the security credentials, the source server 134 grants the agent 224 read-only access to the source database 228. The processor 258 of the agent server 136 is also configured to, responsive to source database schema request 404 received by the agent 224 from the coordinator server 132, compute, via the agent 224, the source database schema 402 and generate source database schema results 210 to transmit to the coordinator server 132.

The processor 258 of the agent server 136 is also configured to, responsive to the agent 224 receiving at least one selected sink hash 508, compute, via the source hash application 230, the source hash tree 509 of a snapshot table 262 stored in the cache 232 and associated with the source database 228. The processor 258 of the agent server 136 is also configured to, responsive to the agent 224 receiving at least one selected sink hash 508, segment, via the source hash application 230, the snapshot table 262 associated with the source database 228 into the source data blocks 421 based on the data block size 615. The processor 258 of the agent server 136 is also configured to, process, via the source hash application 230, the snapshot table 262 into the source hash tree 509 representing the source data blocks 421.

The processor 254 of the source server 134 is also configured to, responsive to the source hash application 230 determining that the at least one selected sink hash 508 differs from the corresponding source hash 511 of the source hash tree 509, generate, via the agent 224, the query results 226. The processor 250 of the coordinator server 132 is also configured to, responsive to instructions from the coordinator service 218, transmit the query results 226 to the configuration server 130, via the communication modules 236, 234 and the sink network 240, where the processor 246 of the configuration server 130, responsive to instructions from the sink hash application 216, updates the sink data source 222 residing in the sink database 212. In certain aspects, the processor 254 of the source server 134 is also configured to transmit, to the coordinator service 218 via the agent 224, the network 150, and the communication modules 238, 236, notifications indicative of updates or changes to the source table 223.

In such aspects of the system 300, the agent server 136 communicates with the source server 134 and acts as an intermediate caching layer with the cache 232. This allows the source hash application 230 to perform hash calculations remote from the source server 134, which can reduce the CPU load of the source server 134, as well as other resources, and allows persistence, which foregoes the need to recalculate the baseline of the source hash tree 509 for each synchronization operation. Such aspects are also advantageous because the synchronization operation can be performed from the snapshot table 262 stored in the cache 232 of the agent server 136. For example, if the source server 134 hosting the source database 228 has operational hours, the source hash tree 509 can be computed on the snapshot table 262 in the cache 232 without intensive calculations interfering with the performance of the source server 134.

Figure 4:
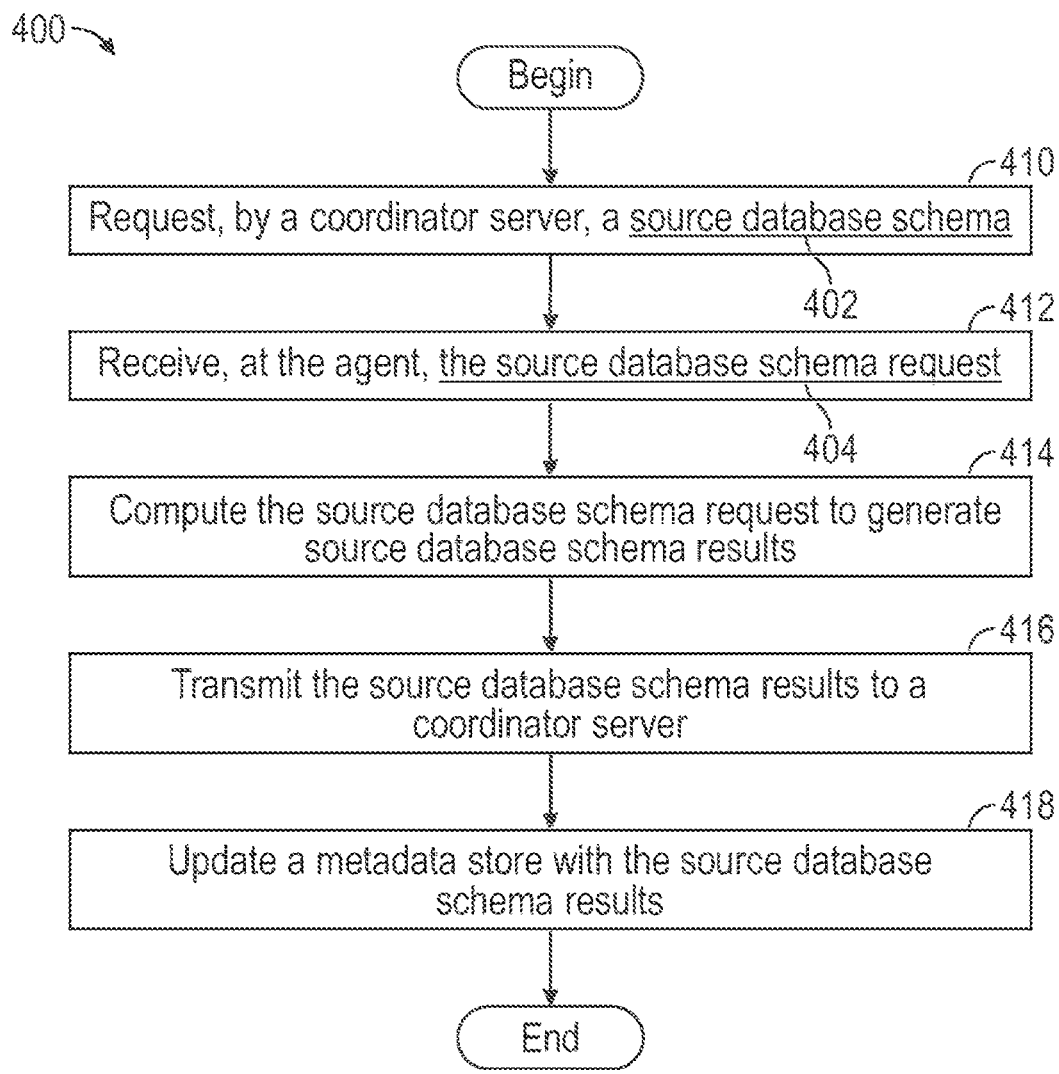
FIG. 4 illustrates an example process for requesting a database schema of a source database for synchronizing distributed data sets using the example servers of FIGS. 2 and 3.

FIG. 4 illustrates an example process 400 for requesting the database schema 402 of the source database 228 of the system 200 of FIG. 2 and the system 300 of FIG. 3. While FIG. 4 is described with reference to the system 200 of FIG. 2 and the system 300 of FIG. 3, it should be noted that the process steps of FIG. 4 may be performed by other systems having more or fewer components as compared with the system 200 of FIG. 2 or the system 300 of FIG. 3.

The process 400 begins by proceeding to step 410 when the coordinator server 132 requests the source database schema 402 of the source database 228 by transmitting the source database schema request 404 to the agent 224. At step 412, the agent 224 receives the request from the coordinator server 132. Responsive to receiving the request, the agent 224 computes the source database schema 402 and generates source database schema results 210, as illustrated at step 414. At step 416, the agent 224 transmits the source database schema results 210 to the coordinator server 132. In some aspects, the coordinator server 132 stores the source database schema results 210 in the memory 252. At step 418, the coordinator server 132 updates the metadata store 214 with the source database schema results 210.

Figure 5:
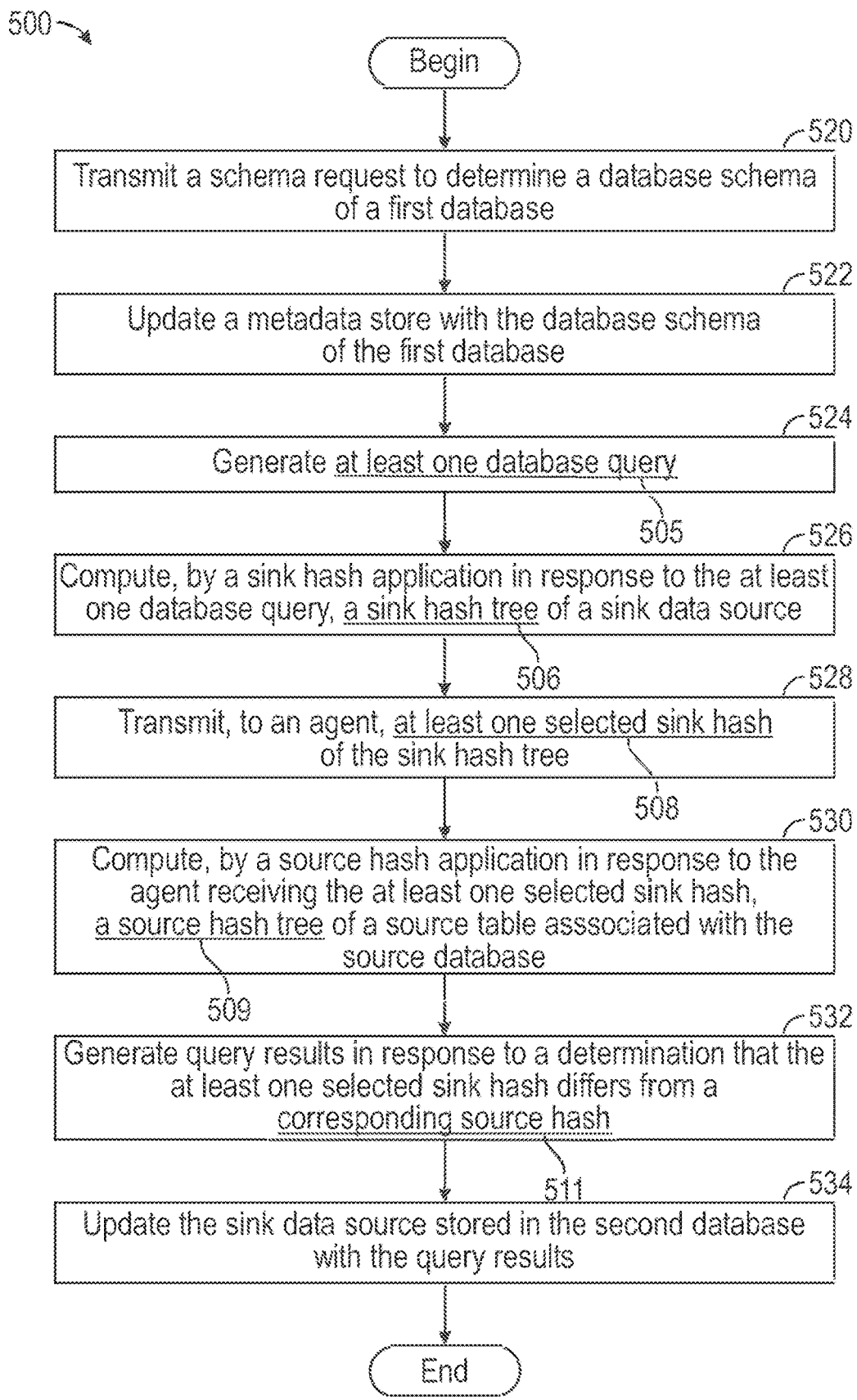
FIG. 5 illustrates an example process for synchronizing distributed data sets using the example servers of FIGS. 2 and 3.

FIG. 5 illustrates an example process 500 for synchronizing distributed data sets, such as, for example, the source database 228 and the sink database 212 of the system 200 of FIG. 2 and the system 300 of FIG. 3. While FIG. 5 is described with reference to the system 200 of FIG. 2 and the system 300 of FIG. 3, it should be noted that the process steps of FIG. 5 may be performed by other systems having more or fewer components as compared with the system 200 of FIG. 2 or the system 300 of FIG. 3.

The process 500 begins by proceeding to step 520 when, the coordinator server 132 transmits the source database schema request 404 to the agent 224 to determine the source database schema 402 of the source database 228. At step 522, responsive to receiving the source database schema 402 from the agent 224, the coordinator server 132 updates the metadata store 214 on the configuration server 130 with the source database schema 402.

Step 524 illustrates the step of the coordinator server 132 generating at least one database query 505. At step 526, responsive to receiving a command associated with the database query 505 from the coordinator server 132, the sink hash application 216 on the configuration server 130 computes the sink hash tree 506 (e.g., sink hashes) of the sink data source 222. Step 528 illustrates the step of transmitting to the agent 224 at least one selected sink hash 508 of the sink hash tree 506. In some aspects, the configuration server 130 transmits the at least one selected sink hash 508 to the agent 224. In some other aspects, the coordinator server 132 transmits the at least one selected sink hash 508 to the agent 224. At step 530, the source hash application 230, in response to the agent 224 receiving the at least one selected sink hash 508, computes the source hash tree 509 of the source table 223 associated with the source database 228. The source hash tree 509 includes source hashes.

The sink hash application 216 and the source hash application 230 create a one-way hash of each sink data block 619 and each source data block 421, respectively, to compute the sink hash tree 506 and the source hash tree 509, respectively. In some aspects, the sink hash tree 506 and the source hash tree 509 are implemented as Merkle trees. The disclosed method allows for each sink data block 619 and each source data block 421 to be variable or dynamic based on the data block size 615. The data block size 615 can be selectively determined or defined as a single column in a row, or a group of rows, of a data set. In certain aspects, the data block size 615 associated with the sink data block 619 and the source data block 421 is computed in a manner to optimize query times to fall within a desired window. Any data transfers per sink data block 619 or source data block 421 also are within the desired window. In certain aspects, the source hash application 230 generates specialized database queries (e.g., dynamically generated queries to facilitate the segmentation of configured data blocks and/or hash calculations) to create the source hash tree 509.

As the windows for query time and data transfer vary on different source systems and change over time, it is desirable to determine the window for particular times of the day to optimize bandwidth availability for the synchronization. For example, in instances when the size of the source table 223 is small, a database query 505 can return only the source data blocks 421, which have changed or have been updated, and which may be the equivalent of a single database row. As the size of the source table 223 increases, however, the window also increases and, in some cases, may be over several hours, which in turn, increases the potential for synchronization issues to occur. For example, a synchronization issue may cause a long-running operation of several hours to stop such that the entire transfer would have to be retried from the beginning. With the ability to dynamically size the window for query time and data transfer, the synchronization operation can include smaller-sized, multiple query operations without posing the possibility of having to retry a long-running operation in the potential event of a synchronization issue. The disclosed method achieves this by segmenting the sink data source 222 and the source table 223 into virtual shards. A virtual shard is defined by computing the hash of the primary key of a row and using a bitmask to identify which shard the hash belongs. Only rows matching the virtual shard that are specified in the synchronization operation are operated on, thus limiting the overall amount of data to process in a single operation. The disclosed method also implements byte level encoding to handle the concepts of "NULL vs. 0" and "variable length data." In certain aspects, the virtual shards are identified by the source hash application 230 via specialized database queries. Similarly, the sink hash application 216 performs a similar process of virtual shard identification such that the selected sink data blocks 619 generate the sink hash tree 506 corresponding to the selected source data blocks 421 and associated source hash tree 509.

At step 532, the agent 224, in response to a determination that the at least one selected sink hash 508 differs from a corresponding source hash 511 of the source hash tree 509, generates the query results 226. At step 534, the sink data source 222 stored in the sink database 212 is updated with the query results 226. In some aspects, the agent 224 updates the sink data source 222 with the query results 226. In some other aspects, the agent 224 transmits the query results 226 to the coordinator server 132, which in turn, updates the sink data source 222 with the query results 226. As a result, in some aspects, the source table 223 of the source database 228 can be completely and accurately reconstructed in the sink database 212.

Figure 6:
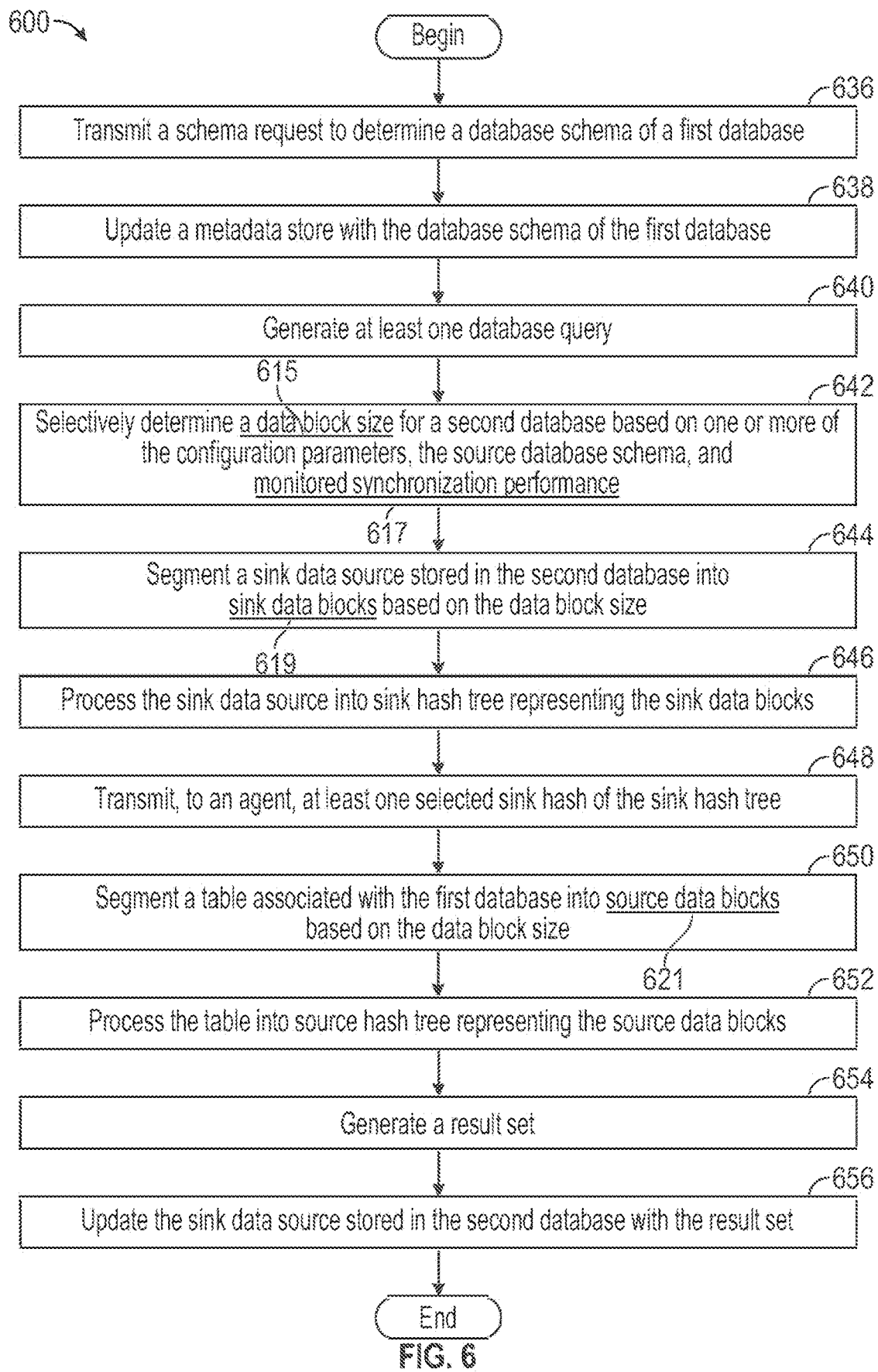
FIG. 6 illustrates another example process for synchronizing distributed data sets using the example servers of FIGS. 2 and 3.

FIG. 6 illustrates an example process 600 for synchronizing distributed data sets, such as, for example, the source database 228 and the sink database 212 of the system 200 of FIG. 2 and the system 300 of FIG. 3. While FIG. 6 is described with reference to the system 200 of FIG. 2 and the system 300 of FIG. 3, it should be noted that the process steps of FIG. 6 may be performed by other systems having more or fewer components as compared with the system 200 of FIG. 2 or the system 300 of FIG. 3. The example process 600 is similar to the example process 500 illustrated in FIG. 5 with additional steps described in more detail.

In a similar manner as process 500 in FIG. 5, the process 600 begins by proceeding to step 636, when, the coordinator server 132 transmits the source database schema request 404 to the agent 224 to determine the source database schema 402 of the source database 228. At step 638, responsive to receiving the source database schema 402 from the agent 224, the coordinator server 132 updates the metadata store 214 on the configuration server 130 with the source database schema 402.

Step 640 illustrates the step of the coordinator server 132 generating at least one database query 505. Steps 642-646 describe the step 526 in process 500 in more detail. For example, step 642 illustrates the sink hash application 216, in response to receiving a command associated with the database query 505 from the coordinator server 132, selectively determines the data block size 615 for the sink database 212 based at least on the configuration parameters 221 and the source database schema 402. In certain aspects, the sink hash application 216, alternatively or additionally, selectively determines the data block size 615 for the sink database 212 based at least on monitored synchronization performance 617 over time between the source database 228 and the sink database 212. At step 644, the sink hash application 216 segments the sink data source 222 stored in the sink database 212 into sink data blocks 619 based on the data block size 615. At step 646, the sink hash application 216 processes the sink data source 222 into sink hash tree 506 representing the sink data blocks 619.

Similar to the step 528 of process 500, the process 600 at step 648 illustrates transmitting to the agent 224 at least one selected sink hash 508 of the sink hash tree 506. In some aspects, the configuration server 130 transmits the at least one selected sink hash 508 to the agent 224. In some other aspects, the coordinator server 132 transmits the at least one selected sink hash 508 to the agent 224.

Step 650 and step 652 describe the step 530 in process 500 in more detail. For example, step 650 illustrates the source hash application 230, responsive to receiving instructions from the agent 224, segmenting the source table 223 associated with the source database 228 into source data blocks 421 based on the data block size 615. At step 652, the source hash application 230 processes the source table 223 into the source hash tree 509 representing the source data blocks 421.

At step 654, the agent 224, in response to a determination that the at least one selected sink hash 508 differs from a corresponding source hash 511 of the source hash tree 509, generates the query results 226. At step 656, the sink data source 222 stored in the sink database 212 is updated with the query results 226. In some aspects, the agent 224 updates the sink data source 222 with the query results 226. In some other aspects, the agent 224 transmits the query results 226 to the coordinator server 132, which in turn, updates the sink data source 222 with the query results 226.

Figure 7:
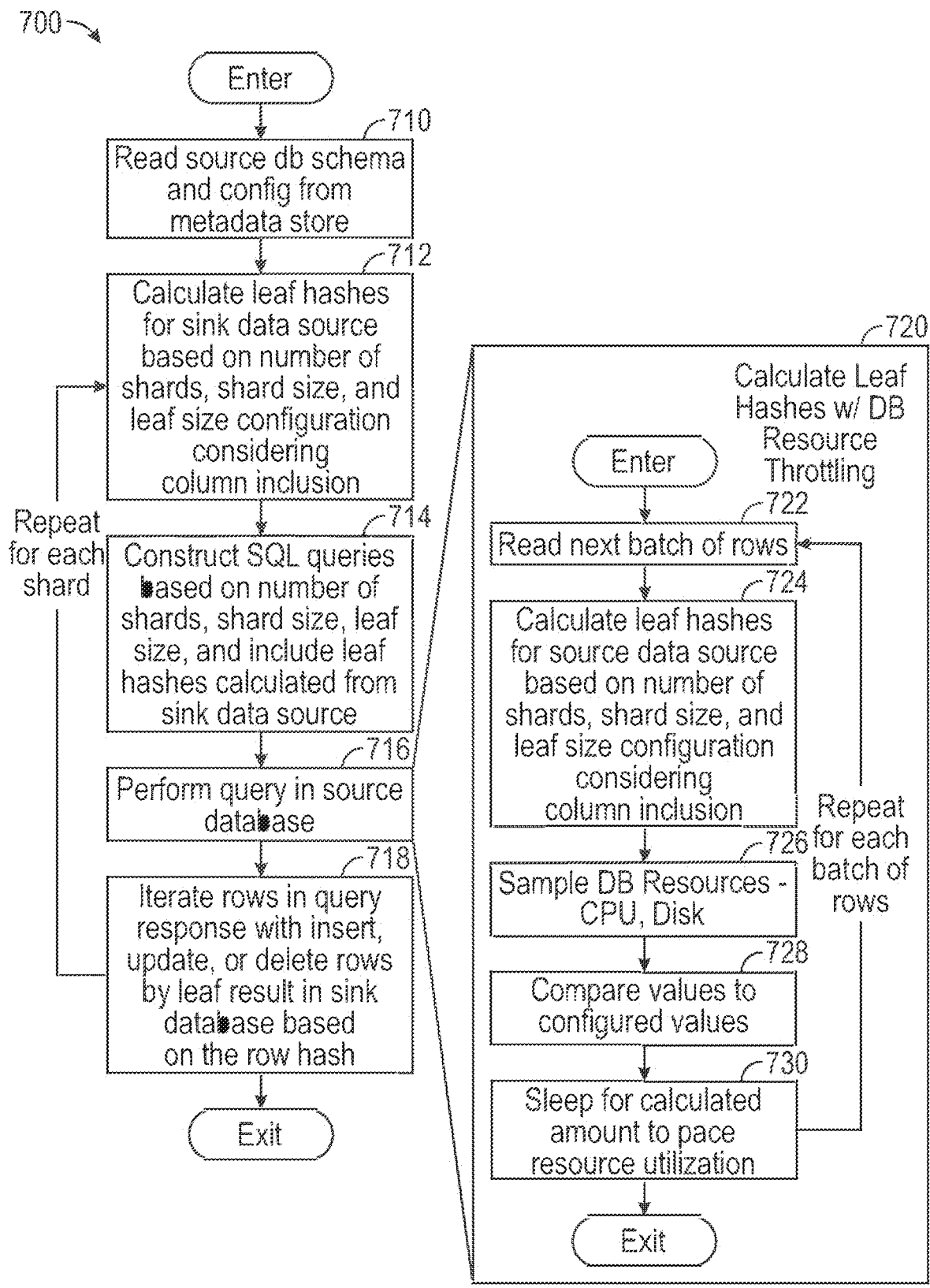
FIG. 7 illustrates an example process for generating a database query with optional throttling of a source server for synchronizing distributed databases using the example servers of FIGS. 2 and 3.

FIG. 7 illustrates an example process 700 for generating a database query with optional throttling of, for example, the source server 134 (and in certain aspects, the agent server 136, as well) for synchronizing distributed databases such as, for example, the source database 228 and the sink database 212 of the system 200 of FIG. 2 and the system 300 of FIG. 3. While FIG. 7 is described with reference to the system 200 of FIG. 2 and the system 300 of FIG. 3, it should be noted that the process steps of FIG. 7 may be performed by other systems having more or fewer components as compared with the system 200 of FIG. 2 or the system 300 of FIG. 3. In certain aspects, such as those of the system 200, the optional throttling can be performed to control utilization of the source server 134 (e.g., the processor 254, the memory 256). In other aspects, such as those of system 300, the optional throttling can be performed to control utilization of the source server 134 (e.g., the processor 254, the memory 256, and the source network 244 via communications module 238) and of the agent server 136 (e.g., the processor 258, the memory 260, and the source network 244 via communications module 242).

The process 700 begins by proceeding to step 710 when, responsive to a synchronization request (either manually triggered or scheduled) from the coordinator server 132, the coordinator service 218 instructs the sink hash application 216 to read the source database schema results 210 and the configuration parameters 221 stored in the metadata store 214. At step 712, the sink hash application 216 calculates the sink hash tree 506 (e.g., leaf hashes) of the sink data source 222 based at least on the source database schema results 210, the configuration parameters 221, number of shards, shard size, and leaf size configuration considering column inclusion. At step 714, the coordinator server 132 generates or constructs the at least one database query 505 based on at least the number of shards, the shard size, the leaf size, and includes the sink hash tree 506 calculated at step 712. At step 716, the agent 224 performs the at least one database query 505.

In certain aspects including throttling, the method proceeds to sub-process 720 when the agent 224, at step 722, instructs the source hash application 230 to read the next batch of rows associated with the source table 223 that are identified in the at least one database query 505. At step 724, the source hash application 230 calculates the source hash tree 509 (e.g., leaf hashes) of the source table 223 based at least on the source database schema results 210, the configuration parameters 221, number of shards, shard size, and leaf size configuration considering column inclusion. At step 726, the agent 224 requests or samples system usage statistics of the source server 134 (e.g., the processor 254, the memory 256, and disk input/output) and, in certain aspects, system usage statistics of the agent server 136 (e.g., the processor 258, the memory 260, disk input/output). At step 728, the agent 224 compares the system usage statistics to a predetermined throttling configuration setting. For example, the predetermined throttling configuration may be set to 50%. At step 730, the processor 254 of the source server 134 sleeps for the throttling duration based on comparison of the system usage statistics and the predetermined throttling configuration settings to pace resource utilization of the source server 134 and, in certain aspects, the agent server 136. For example, at a predetermined throttling configuration of 50% and a system usage statistic of 50 milliseconds to process a batch of rows, the agent 224 sleeps for 50 milliseconds prior to processing the next batch of rows. Although the above example illustrates specific values, other time-slicing methods are within the scope of the present application.

After step 730 is completed, the method is returned to step 722 for each batch of rows or exits the sub-process 720 and proceeds to step 718. At step 718, the agent 224 iterates rows identified in the at least one query 505 with instructions to either insert, update, or delete rows by the query results 226 (e.g., leaf results) in the sink database 212 based on the row hash. After step 718 is completed, the method is either returned to step 712, to repeat for each shard, or ends.

Figure 8:
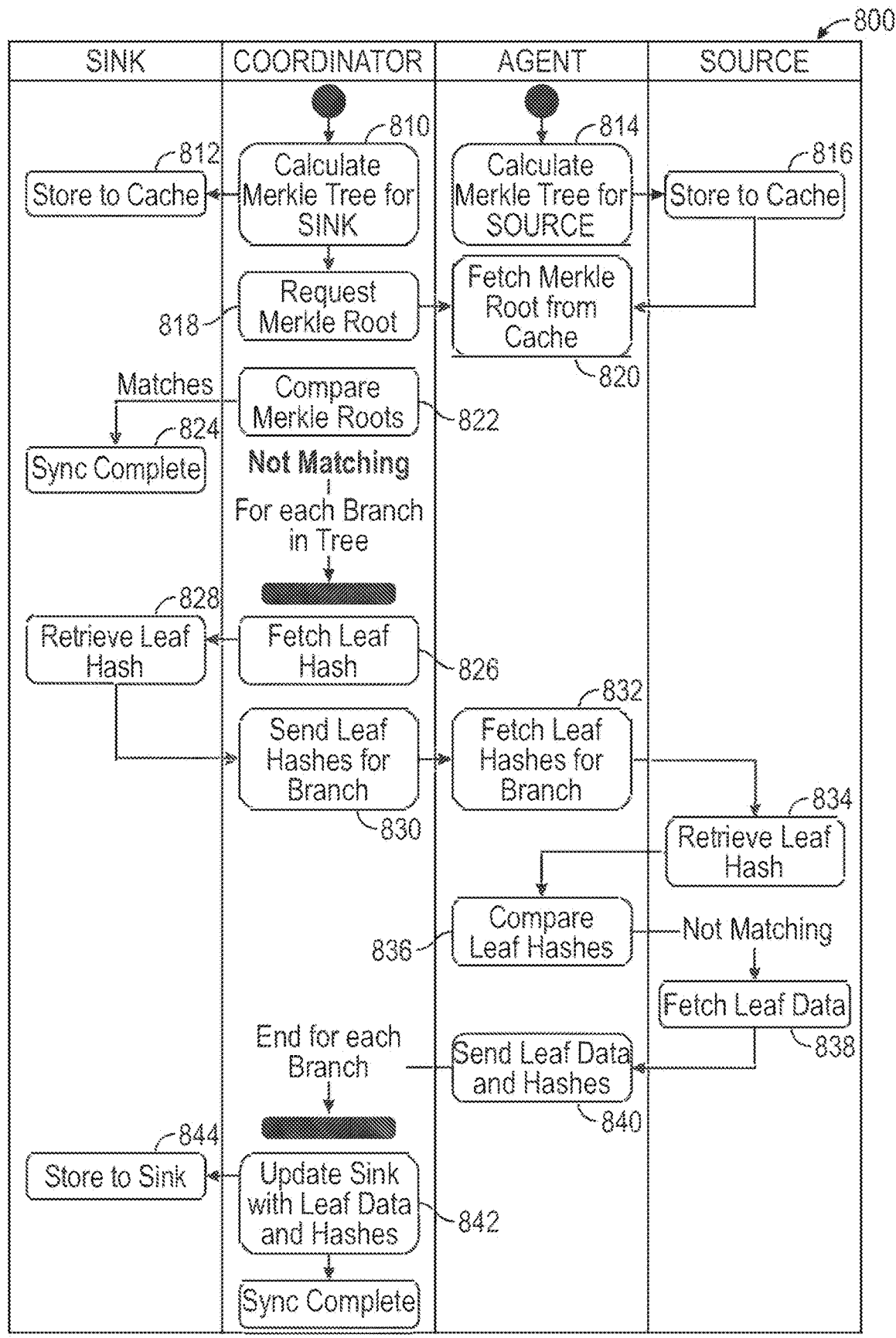
FIG. 8 illustrates an example process for bidirectional data flow for synchronizing distributed databases using the example servers of FIG. 3.

FIG. 8 illustrates an example process 800 for bidirectional data flow for synchronizing distributed databases, such as, for example, the source database 228 and the sink database 212 of the system 300 of FIG. 3. While FIG. 8 is described with reference to the system 300 of FIG. 3, it should be noted that the process steps of FIG. 8 may be performed by other systems having more or fewer components as compared with the system 300 of FIG. 3. In such methods and systems, the bidirectional data flow fully utilizes the Merkle trees (e.g., the sink hash tree 506 and the source hash tree 509). With the computation of each of the sink hash tree 506 and the source hash tree 509, during the bidirectional data flow for the synchronization of the distributed databases (e.g., the source database 228 and the sink database 212), only the top hash of the sink hash tree 506 needs to be sent, and down each branch of the source hash tree 509, to allow the minimum number of hashes to be sent across the network 150.

The process 800 illustrates, at step 810, the coordinator server 132 computing, via the sink hash application 216, the sink hash tree 506 and, at step 812, the storing of the sink hash tree 506 at the sink database 212. At step 814, the agent 224 computes, via the source hash application 230, the source hash tree 509 and, at step 816, stores the source hash tree 509 at the cache 232. At step 818, the coordinator server 132 requests the agent 224 to retrieve a hash root of the source hash tree 509 from the cache 232. At step 820, the agent 224 receives the instruction from the coordinator server 132 to retrieve the hash root of the source hash tree 509 from the cache 232. At step 822, the coordinator server 132 compares the retrieved hash root of the source hash tree 509 to hash roots of the sink hash tree 506. If the coordinator server 132 determines that the hash roots match, then the synchronization is complete, as illustrated at step 824. If the coordinator server 132, on the other hand, determines that the hash roots do not match, then, for each branch of the sink hash tree 506, the coordinator server 132 retrieves a leaf hash of the sink hash tree 506, as illustrated at step 826.

Step 828 illustrates the retrieval of the leaf hash of the sink hash tree 506. At step 830, the coordinator server 132 transmits to the agent 224 the leaf hash. At step 832, the agent 224 requests from the cache 232 the leaf hash of the source hash tree 509. As illustrated at step 834, the agent 224 retrieves the leaf hash of the source hash tree 509 from the cache 232. At step 836, the agent 224 compares the leaf hash of the sink hash tree 506 to the leaf hash of the source hash tree 509. If the agent 224 determines that the leaf hashes do not match, then the process 800 proceeds to step 838, which illustrates the coordinator server 132 retrieving the leaf hash data. At step 840, the agent 224 transmits the leaf hash data and the leaf hashes to the coordinator server 132. Step 842 illustrates the coordinator server 132 updating the sink database 212 with the leaf hash data and the leaf hashes. As illustrated at step 844, the coordinator server 132 stores the leaf hash data and the leaf hashes in the sink database 212.

Hardware Overview

Figure 9:
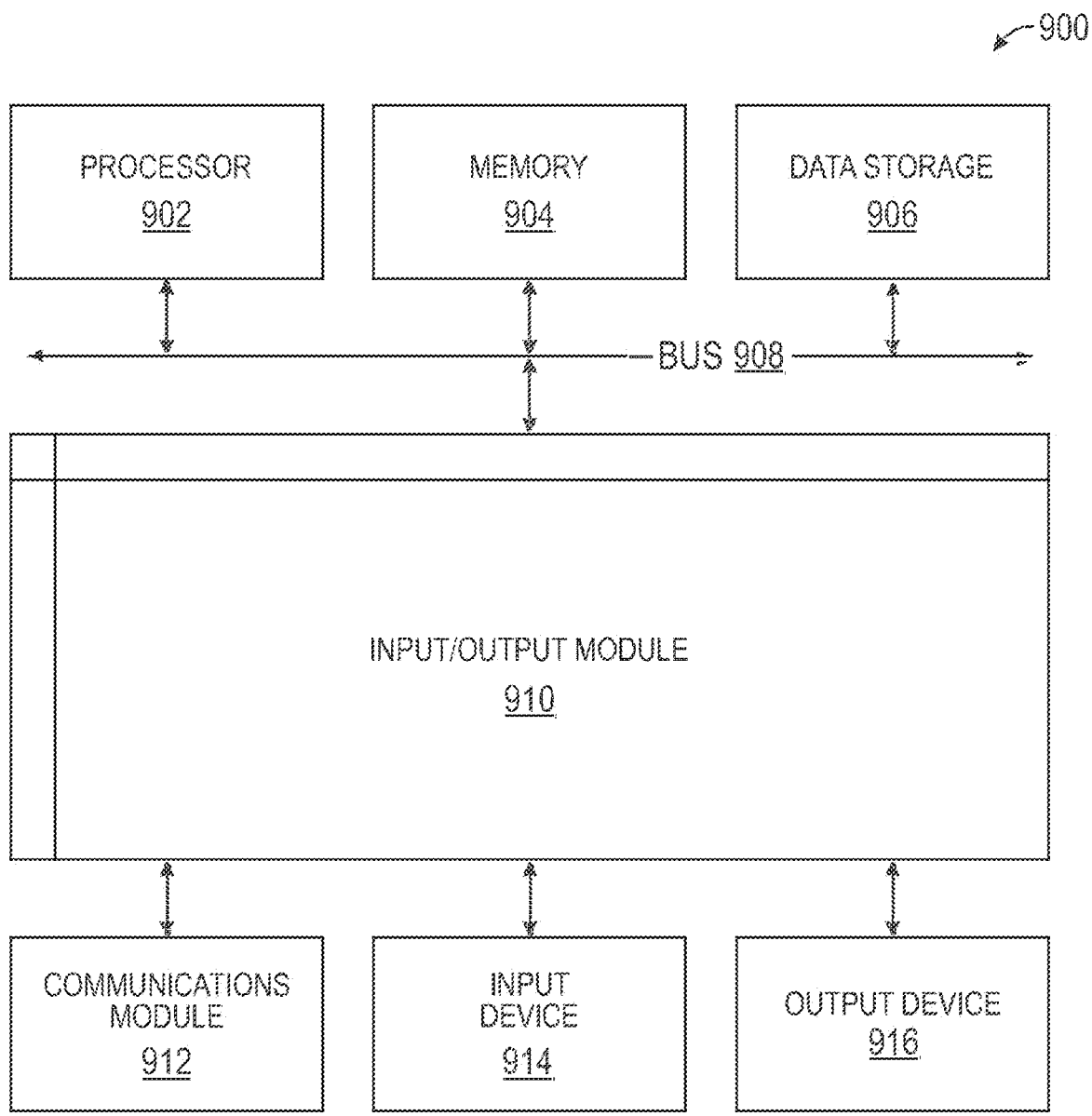
FIG. 9 is a block diagram illustrating an example computer system with which the example servers of FIGS. 2 and 3 may be implemented.

FIG. 9 is a block diagram illustrating an example computer system 900 with which the configuration server 130, the coordinator server 132, the source server 134, and the agent server 136 of FIG. 3 can be implemented. In certain aspects, the computer system 900 may be implemented using hardware or a combination of software and hardware, either in a dedicated server, integrated into another computing component, or distributed across multiple computing components.

Computer system 900 (e.g., the configuration server 130, the coordinator server 132, the source server 134, and the agent server 136) may include a bus 908 and/or another suitable communication mechanism for communicating information, and one or more processors 902 (e.g., processors 246, 250, 254, 258) coupled with the bus 908 for processing information. According to one aspect, the computer system 900 can be a cloud computing server of an IaaS that is able to support PaaS and SaaS services. According to an example embodiment, the computer system 900 is implemented as one or more special-purpose computing devices. The special-purpose computing device may be hard-wired to perform the disclosed techniques, and/or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, or FPGAs with custom programming to accomplish the techniques contemplated herein throughout. The special-purpose computing devices may be desktop computer systems, portable computer systems, handheld devices, networking devices, and/or any other device that incorporates hard-wired and/or program logic to implement the techniques. By way of example, the computer system 900 may be implemented with the one or more processors 902. The one or more processors 902 may comprise a general-purpose microprocessor, a microcontroller, a Digital Signal Processor (DSP), an ASIC, an FPGA, a Programmable Logic Device (PLD), a controller, a state machine, gated logic, discrete hardware components, or any other suitable entity that can perform calculations or other manipulations of information.

The computer system 900 may include, in addition to hardware, code that creates an execution environment for the computer program in question, e.g., code that constitutes processor firmware, a protocol stack, a database management system, an operating system, or a combination of one or more of them stored in an included memory 904 (e.g., memory 248, 252, 256, 260), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, and/or any other suitable storage device of combination of storage devices, coupled to the bus 908 for storing information and instructions to be executed by the one or more processors 902. The processor(s) 902 and the memory 904 can be supplemented by, or incorporated in, special purpose logic circuitry. Expansion memory may also be provided and connected to computer system 900 through input/output module 910, which may include, for example, a SIMM (Single In Line Memory Module) card interface. Such expansion memory may provide extra storage space for computer system 900, or may also store applications or other information for computer system 900. Specifically, expansion memory may include instructions to carry out or supplement the processes described above, and may further include secure information. Thus, for example, expansion memory may be provided as a security module for computer system 900, and may be programmed with instructions that permit secure use of computer system 900. In addition, secure applications may be provided via the SIMM cards, along with additional information, such as placing identifying information on the SIMM card in a non-hackable manner.

The instructions may be stored in the memory 904 and implemented in one or more computer program products, e.g., one or more modules of computer program instructions encoded on a computer readable medium for execution by, or to control the operation of, the computer system 900, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). The memory 904 may also be used for storing temporary variables or other intermediate information during execution of instructions to be executed by the processor(s) 902.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 900 further includes a data storage device 906 such as a magnetic disk or optical disk, coupled to bus 908 for storing information and instructions. Computer system 900 may be coupled via input/output module 910 to various devices. The input/output module 910 can be any input/output module. Example input/output modules 910 include data ports such as USB ports. In addition, input/output module 910 may be provided in communication with the processor(s) 902, so as to enable near area communication of computer system 900 with other devices. The input/output module 910 may provide, for example, for wired communication in some implementations, or for wireless communication in other implementations, and multiple interfaces may also be used. The input/output module 910 is configured to connect to a communications module 912. The communications modules 912 (e.g., communications modules 234, 236, 238, 242) may comprise networking interface cards, such as Ethernet cards and/or modems.

The components of the system can be interconnected by any form or medium of digital data communication, e.g., a communication network. The communication network (e.g., network 150, sink network 240, source network 244) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, the communications module 912 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, the communications module 912 sends and receives electrical, electromagnetic or optical signals that carry digital data streams representing various types of information. The network link typically provides data communication through one or more networks to other data devices. For example, the network link of the communications module 912 may provide a connection through a local network to a host computer or to data equipment operated by an Internet Service Provider (ISP). The ISP in turn provides data communication services through the world wide packet data communication network now commonly referred to as the "Internet". The local network and Internet both use electrical, electromagnetic or optical signals that carry digital data streams. The signals through the various networks and the signals on the network link and through the communications module 912, which carry the digital data to and from the computer system 900, are example forms of transmission media.

The computer system 900 can send messages and receive data, including program code, through the network(s), the network link and communications module 912. In the Internet example, a server might transmit a requested code for an application program through the Internet, the ISP, the local network, and the communications module 912. The received code may be executed by the processor(s) 902 as it is received, and/or stored in the data storage device 906 for later execution.

In certain aspects, the input/output module 910 is configured to connect to a plurality of devices, such as an input device 914 and/or an output device 916. Example input devices 914 include a keyboard and a pointing device, e.g., a mouse or a trackball, by which a user can provide input to the computer system 900. Other kinds of input devices 914 can be used to provide for interaction with a user as well, such as a tactile input device, visual input device, audio input device, or brain-computer interface device.

According to one aspect of the present disclosure, the configuration server 130, the coordinator server 132, the source server 134, and the agent server 136 can be implemented using the computer system 900 in response to the processor(s) 902 executing one or more sequences of one or more instructions contained in the memory 904. Such instructions may be read into the memory 904 from another machine-readable medium, such as the data storage device 906. Execution of the sequences of instructions contained in the memory 904 causes the processor(s) 902 to perform the process steps described herein. One or more processors in a multi-processing arrangement may also be employed to execute the sequences of instructions contained in the memory 904. The processor(s) 902 may process the executable instructions and/or data structures by remotely accessing the computer program product, for example by downloading the executable instructions and/or data structures from a remote server through the communications module 912 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

As mentioned hereinabove, the computing system 900 may include clients and servers. A client and server are generally remote from each other and typically interact through a communication network. The relationship of client and server arises by virtue of computer programs running on the respective computers and having a client-server relationship to each other. The computer system 900 can be, for example, and without limitation, a desktop computer, laptop computer, or tablet computer. Computer system 900 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to the processor(s) 902 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as the data storage device 906. Volatile media include dynamic memory, such as the memory 904. Transmission media include coaxial cables, copper wire, and fiber optics, including the wires that include the bus 908. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that include bus 908. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components)

recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter. The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for synchronizing distributed databases, the computer-implemented method comprising:
   identifying a database schema of a first database;
   receiving at least one database query generated based on the database schema to check the first database for data matches in a second database, the at least one database query identifying at least part of a table associated with the first database;
   receiving, from a server, a selected sink hash representing a sink data block from a sink data source stored in the second database;
   segmenting the table associated with the first database into source data blocks, wherein the source data blocks are variable based on data block sizes, the data block sizes determined based on monitored synchronization performance of historical queries between the first database and the second database;
   processing the table into source hashes representing the source data blocks;
   generating, in response to a determination that the selected sink hash differs from a corresponding source hash of the source hashes, query results; and
   updating the sink data source stored in the second database with the query results.

2. The computer-implemented method of claim 1, further comprising updating a metadata store with the database schema of the first database, the metadata store comprising the database schema of the first database and configuration parameters.

3. The computer-implemented method of claim 1, further comprising selectively determining, responsive to the at least one database query, a data block size for the second database based on the database schema.

4. The computer-implemented method of claim 1, further comprising segmenting the sink data source stored in the second database, at least partially, into the sink data block.

5. The computer-implemented method of claim 4, wherein segmenting the sink data source stored in the second database into sink data blocks based on the data block sizes comprises segmenting the sink data source into virtual shards.

6. The computer-implemented method of claim 1, further comprising processing the sink data source into the selected sink hash.

7. The computer-implemented method of claim 1, wherein segmenting the table is performed by an agent hosted on a source server and wherein the table is a source table stored in the first database.

8. The computer-implemented method of claim 1, wherein segmenting the table is performed by an agent hosted on an agent server and wherein the table is cached in a cache hosted on the agent server.

9. The computer-implemented method of claim 1, further comprising transmitting, from a source server to an agent, notifications indicative of updates to the table.

10. The computer-implemented method of claim 1, further comprising selectively determining the data block size for a source data block based on the monitored synchronization performance over time between the first database and the second database.

11. A system comprising:
   a memory comprising instructions; and
   one or more processors configured to execute the instructions to:
      receive, from a server, a schema request to determine a source database schema of a source database hosted on a source server;
      receive, from the server, at least one database query generated based on the source database schema to check the source database for data matches in a sink database, the at least one database query identifying at least part of a source table associated with the source database;
      compute, by a sink hash application in response to the at least one database query, a sink hash tree of a sink data source, the sink hash tree including sink hashes;
      receive, from the server, at least one selected sink hash of the sink hashes;
      compute, by a source hash application, a source hash tree of the source table associated with the source database, the source hash tree including source hashes representing source data blocks, wherein the source data blocks are variable based on data block sizes determined based on monitored synchronization performance of historical queries between the source database and the sink database;
      generate, in response to a determination that the at least one selected sink hash differs from a corresponding source hash of the source hashes, query results; and
      update the sink data source stored in the sink database with the query results.

12. The system of claim 11, wherein the one or more processors further execute instructions to update a metadata store with the source database schema of the source database, the metadata store comprising the source database schema of the source database and configuration parameters.

13. The system of claim 11, wherein the one or more processors further execute instructions to selectively determine, responsive to the at least one database query, a data block size for the sink database based on the source database schema.

14. The system of claim 11, wherein the one or more processors further execute instructions to:
   segment the sink data source stored in the sink database, at least partially, into a sink data block; and
   process the sink data source into the at least one selected sink hash.

15. The system of claim 11, further comprising an agent hosted on the source server, the agent being configured to compute the sink hash tree.

16. The system of claim 11, further comprising an agent hosted on an agent server that is remote from the source server, the agent being configured to compute the sink hash tree.

17. The system of claim 11, wherein the one or more processors are further configured to execute the instructions to:
   transmit, from the source server, notifications indicative of updates to the source table.

18. The system of claim 11, wherein the instruction to generate the query results is performed under throttling.

19. A non-transitory machine-readable storage medium comprising machine-readable instructions for causing one or more processors to execute a method, the method comprising:
   identifying a source database schema of a source database hosted on a source server;
   receiving at least one database query generated based on the source database schema to check the source database for data matches in a sink database, the at least one database query identifying at least part of a source table associated with the source database;

segmenting a sink data source stored in the sink database into sink data blocks based on data block sizes;

processing the sink data source into sink hashes representing the sink data blocks;

receiving, from a server, a selected sink hash;

segmenting the source table stored in the source database into source data blocks, wherein the source data blocks are variable based on the data block sizes, the data block sizes determined based on monitored synchronization performance of historical queries between the source database and the sink database;

processing the source table into source hashes representing the source data blocks;

generating, in response to a determination that the selected sink hash differs from a corresponding source hash of the source hashes, query results; and updating the sink data source stored in the sink database with the query results.

20. The non-transitory machine-readable storage medium of claim 19, wherein the method further comprises determining, responsive to the at least one database query, a data block size for the sink database further based on a monitored synchronization performance over time between the source database and the sink database.

\* \* \* \* \*